June 29, 1937.   KARL-HEINZ BARUTH   2,085,489
PROCESS FOR PREPARING TEA FREE FROM THEINE
Filed Oct. 16, 1935
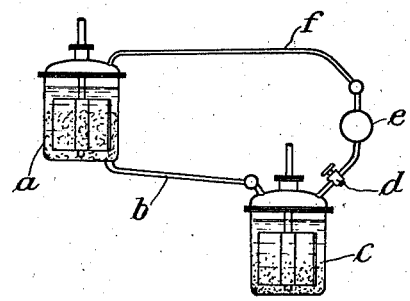
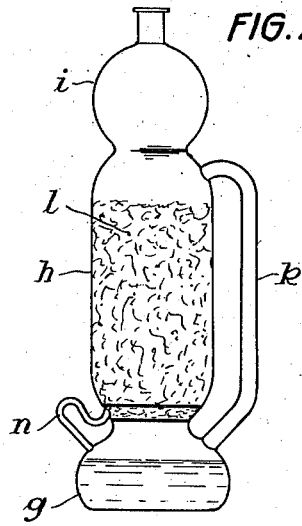
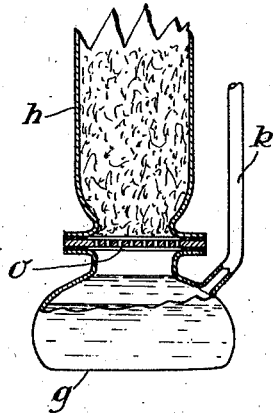
Inventor:
Karl-Heinz Baruth
By: Glascock Downing & Seebold
Attys.

Patented June 29, 1937

2,085,489

UNITED STATES PATENT OFFICE 2,085,489

PROCESS FOR PREPARING TEA FREE FROM THEINE

Karl-Heinz Baruth, Berlin-Charlottenburg, Germany

Application October 16, 1935, Serial No. 45,349
In Germany June 9, 1934

6 Claims. (Cl. 99—69)

It is known that tea, like coffee, contains a certain amount of caffeine or theine which, when tea is frequently partaken, may have an injurious action on the heart and nerves. Attempts have been made, therefore, to free the tea leaves from the theine. A special difficulty arises in effecting the removal of theine namely that the particularly sensitive aroma must in the case of tea be maintained, in contradistinction to the process in the case of coffee where the aroma is first produced in a process (roasting) which is carried out after the extraction. Further it has to be borne in mind that theine, which possesses basic properties, is present in the leaf partly bound to plant acids so that for the purpose of extraction a liberation from this combination is first of all necessary.

The known processes, in which the aroma substances are first dissolved out of the tea before the liberation and extraction of the theine, have various disadvantages, since substances are used as solvents which are unsuitable and in part also are liable to catch fire. A further disadvantage of the known processes consists in the fact that the tea undergoes a swelling under heat treatment and more particularly by the action of steam, with the consequence that the end product acquires an unattractive appearance. Thus, for example, the contact of tea with ammonia gas in the hot leads to an impairment in the colour, so that the tea leaves after such treatment exhibit a repulsive brown-yellow appearance. Furthermore, the pleasant taste of the tea suffers when treated by the known processes.

The present invention removes the aforesaid disadvantages. According to the invention quite low boiling solvents are first of all used for preparing the extract of aroma substances, more particularly halogen compounds, since only such dissolve sufficiently small quantities of theine. Acetylene dichloride has proved to be particularly suitable for on account of its low boiling point it practically does not dissolve theine at all under the prevailing conditions. This agent, moreover, is in contradistinction to those hitherto employed, non-inflammable.

The extract of aroma substances is added again to the tea freed from theine. The solvent is then cautiously evaporated, it scarcely being possible to avoid loss of small quantities of aroma substances as a result of the evaporation. Such losses can be completely avoided if, in accordance with the invention, solvents are used for the extraction of aroma substances which are themselves still more volatile than the aroma substances. Such solvents are, for example, methyl or ethyl chloride, which at ordinary temperature can be maintained liquid only under pressure. Operating with these solvents naturally requires a special apparatus, which is shown schematically in Fig. 1 of the accompanying drawing.

The extraction of the tea with methyl or ethyl chloride is effected at normal temperature (maximum 25–30° C.) in a stirring autoclave $a$. The tea freed from aroma substances is then subsequently freed from theine in the usual way by extraction with carbon tetrachloride. The aroma extract flows through a pressure lead $b$ to a stirring autoclave $c$, where it reaches a quantity of tea freed from theine. By gradually releasing the pressure by means of a valve $d$ a quiet and complete volatilization of the solvent is attained and an extremely uniform distribution of the aroma substances on the tea. The solvent vapours are liquefied again in a pump device $e$. The liquefied extraction agent may then be led back to the autoclave $a$ through a lead $f$. As mentioned above, by using a solvent of extremely low boiling point for preparing the extract of aroma substances, no heat has to be supplied for removing this solvent from the tea and so all loss of aroma substances is avoided.

The theine is liberated by means of a short pretreatment with a volatile, not too strong base which one can completely remove again during the extraction, more particularly ammonia or aliphatic amines.

The treatment with ammonia is carried out so that the tea contained in a rotating drum is impregnated with a moderately concentrated alcoholic solution of ammonia. As compared with the known methods of procedure this process offers the substantial advantage of avoiding the employment of steam, so that in spite of the use of ammonia an end product is formed which is satisfactory as regards appearance and pleasing taste. The tea is treated with alcoholic ammonia solution without any heating, so that no swelling of the tea takes place.

For dissolving the theine advantageously carbon tetrachloride is used. An apparatus for effecting this extraction is shown in Fig. 2 of the accompanying drawing. According to the invention three containers are provided, preferably situated one above the other, one of which contains the solvent, the second the tea to be extracted, whilst the third is constructed as a condenser, which are so interconnected that the vaporized solvent condensing in the condenser or in the tea circulates through the three containers and thereby gradually extracts the theine.

The solvent is evaporated in the vessel g, which is heated with steam, and passes through a tube k into the container h or i, where the solvent condenses. The condensate drops on to the tea l in the container h, flows over the same, and the extract collects at m on the bottom of the container, whence the extract returns to the container g through an overflow tube n.

Instead of the overflow tube n acting as a liquid closure, according to Fig. 3 the bottom of the container h may also be constructed as a sieve, as is indicated by o. The liquid collecting over the filter prevents the solvent vapours passing from underneath into the container h.

As compared with the afore-described apparatus, this apparatus offers the advantage that it requires less solvent and operates more uniformly.

What I claim is:—

1. A process for preparing tea free from theine without employment of steam and heat, consisting in applying solvents which are low-boiling for withdrawing the aroma substances from the tea, thereupon applying basic compounds dissolved in alcohol for splitting up the theine salts, applying a volatile solvent for removing the theine, thereupon adding the solution of aroma substances and finally vaporizing the solvent, said low-boiling solvents being selected from a group consisting of acetylene dichloride, methyl chloride and ethylchloride.

2. A process for preparing tea free from theine consisting in applying acetylene dichloride for withdrawing the aroma substances from the tea, thereupon applying basic compounds dissolved in alcohol for splitting up the theine salts, applying a volatile solvent for removing the theine, thereupon adding the solution of aroma substances and finally vaporizing the acetylene dichloride.

3. A process for preparing tea free from theine consisting in applying ethyl chloride for withdrawing the aroma substances from the tea, thereupon applying basic compounds dissolved in alcohol for splitting up the theine salts, applying a volatile solvent for removing the theine, thereupon adding the solution of aroma substances and finally vaporizing the ethyl chloride.

4. A process for preparing tea free from theine consisting in applying methyl chloride for withdrawing the aroma substances from the tea, thereupon applying basic compounds dissolved in alcohol for splitting up the theine salts, applying a volatile solvent for removing the theine, thereupon adding the solution of aroma substances and finally vaporizing the methyl chloride.

5. A process for preparing tea which is free from theine, consisting in applying low-boiling halogen compounds for withdrawing the aroma substances from the tea, thereupon applying basic compounds dissolved in alcohol, for splitting the theine salts, applying a volatile solvent for removing the theine, thereupon adding the solution of the aroma substances and finally evaporating the solvent.

6. A process for preparing tea free from theine, consisting in applying low-boiling organic halogen compounds for withdrawing the aroma substances out of the tea, thereupon applying ammonia dissolved in alcohol for splitting the theine salts, applying a volatile solvent for removing the theine, thereupon adding the solution of the aroma substances and finally vapourizing the solvent.

KARL-HEINZ BARUTH.